United States Patent
Read

(10) Patent No.: US 7,585,579 B1
(45) Date of Patent: Sep. 8, 2009

(54) ELECTROLYTE FOR METAL-OXYGEN BATTERY AND METHOD FOR ITS PREPARATION

(75) Inventor: Jeffrey A. Read, West Friendship, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/628,424

(22) Filed: Jul. 29, 2003

(51) Int. Cl.
  *H01M 4/00* (2006.01)
(52) U.S. Cl. .................. 429/29; 429/188; 429/324; 429/326; 429/322; 429/231.95
(58) Field of Classification Search .......... 429/29, 429/322, 231.95, 239.95, 27, 322.23, 1.95, 429/188, 324, 326
See application file for complete search history.

(56) References Cited

U.S. PATENT DOCUMENTS

| | | | |
|---|---|---|---|
| 3,948,684 A | 4/1976 | Armstrong | |
| 4,246,253 A | 1/1981 | Hunter | |
| 4,329,404 A * | 5/1982 | Bowden et al. | 429/50 |
| 5,252,413 A | 10/1993 | Alamgir et al. | 429/192 |
| 5,482,797 A | 1/1996 | Yamada et al. | |
| 5,491,041 A | 2/1996 | Abraham et al. | |
| 5,510,209 A * | 4/1996 | Abraham et al. | 429/310 |
| 5,626,985 A | 5/1997 | Shoji et al. | |
| 5,824,434 A * | 10/1998 | Kawakami et al. | 429/209 |
| 6,053,953 A | 4/2000 | Tomiyama et al. | |
| 6,322,744 B1 | 11/2001 | Kelley et al. | |
| 6,368,365 B1 | 4/2002 | Chi et al. | |
| 6,372,370 B1 | 4/2002 | Kaplan et al. | |
| 6,395,430 B1 | 5/2002 | Cho et al. | 429/316 |
| 6,506,520 B1 * | 1/2003 | Inoue et al. | 429/231.95 |
| 6,548,208 B1 | 4/2003 | Kasamatsu et al. | 429/281.1 |
| 6,558,846 B1 | 5/2003 | Tsushima et al. | |
| 6,593,023 B2 | 7/2003 | Chang et al. | |
| 6,984,471 B2 | 1/2006 | Suzuki et al. | |
| 6,991,876 B2 * | 1/2006 | Narang et al. | 429/231.95 |
| 2002/0081449 A1 | 6/2002 | Nakajima et al. | |
| 2003/0096168 A1 | 5/2003 | Kasamatsu et al. | 429/231.95 |
| 2004/0091774 A1 * | 5/2004 | Narang et al. | 429/218.1 |

OTHER PUBLICATIONS

Read. J. Journal of The Electrochemical Society, 149 (9) A1190-A1195 (2002).

(Continued)

*Primary Examiner*—Jane Rhee
(74) *Attorney, Agent, or Firm*—William V. Adams; Lawrence E. Anderson

(57) ABSTRACT

An electrolyte for a metal-oxygen battery includes a non-aqueous solvent which is characterized in that the solubility of oxygen therein is at least 0.1150 cc $O_2$/cc of solvent at STP. The electrolyte also includes an electrolyte salt dissolved in the solvent. The solvent may comprise a mixture of materials in which at least 50%, on a weight basis, of the materials have an oxygen solubility of at least 0.1760 cc $O_2$/cc at STP. Also disclosed is a method for optimizing the composition of an electrolyte for a metal-oxygen battery by selecting the solvent for the electrolyte from those materials which will dissolve the electrolyte salt and which have a solubility for oxygen which is at least 0.1150 cc $O_2$/cc at STP.

5 Claims, 3 Drawing Sheets

OTHER PUBLICATIONS

Abraham, K.M. and Jiang, Z. Journal of The Electrochemical Society, 143, 1 (1996).

Handbook of Batteries, Chapter 31 Metal/air Batteries, by Robert P. Hamlen and Terrill B. Atwater, pp. 38.1-38.54 Copyrighted 2002.

Thackeray, Michael, "Lithium-Ion Batteries: An Unexpected Conductor," 2002 Nature Publishing Group, vol. 1, Nature Materials 1, 81-82 (2002).

* cited by examiner

ELECTROLYTE FOR METAL-OXYGEN BATTERY AND METHOD FOR ITS PREPARATION

GOVERNMENT INTEREST

The invention described herein may be manufactured, used, and licensed by or for the United States Government.

FIELD OF THE INVENTION

This invention relates generally to electrochemical cells. More specifically, the invention relates to metal-oxygen batteries. Most specifically, the invention relates to electrolytes for metal-oxygen batteries and to methods for the optimization of such electrolyte compositions.

BACKGROUND OF THE INVENTION

Metal-oxygen batteries, which are also referred to as metal-air batteries, are a class of electrochemical cells in which oxygen, which is typically obtained from the ambient environment, is reduced at a catalytic cathode surface as part of the electrochemical cell reaction. Reduction of the oxygen forms an oxide or peroxide ion which reacts with a cationic metal species. Metal-oxygen batteries have been developed based upon Fe, Zn, Al, Mg, Ca, and Li. It is acknowledged that in the strictest sense a "battery" is an electrochemical device comprised of a number of separate electrochemical cells interconnected to a single set of terminals to provide an output which is cumulative in terms of voltage and/or current of each of the individual cells. However, for purposes of the present disclosure, and in keeping with vernacular terminology, the term "battery" will be used herein to define electrochemical power generation and/or storage devices comprised of single cells as well as plural, interconnected cells.

Lithium-oxygen batteries represent one type of metal-oxygen battery. In devices of this type, an electro-active cathode and a lithium-containing anode are disposed in an electrolyte which provides for ionic communication therebetween. During the discharge of the cell, oxygen is reduced at the electroactive cathode to produce $O^{-2}$ and/or $O_2^{-2}$ ions which react with the lithium to produce $Li_2O_2$ and/or $Li_2O$ which deposits on the cathode. Such cells provide an operating voltage in the typical range of 2.0-2.8 V, and an open circuit voltage of 2.85 V, and they have a good charge storage capacity.

The electrolyte is an important component of any battery, since it functions to solvate, and provide transport for, the electro-active components of the battery system. Typical electrolytes comprise a solvent having one or more electrolyte salts dissolved therein. Heretofore, conventional wisdom with regard to metal-oxygen batteries has held that solvents for the electrolytes of such batteries should have a very high dielectric constant so that they can effectively solvate electrolyte salts so as to provide for high ionic conductivity, and that they have high boiling points. U.S. Pat. No. 5,510,209 discloses a lithium-oxygen battery, and specifically teaches that the electrolyte component of this battery includes solvents which meet the foregoing criteria.

In accord with the present invention, it has been found that the solubility of oxygen in a solvent is the primary factor which must be considered when formulating electrolytes for metal-oxygen batteries. As will be explained hereinbelow, solvent systems prepared in accord with the present invention provide metal-oxygen batteries which manifest performance characteristics such as discharge capacity and rate capability which exceed those achieved through the use of solvent mixtures of the prior art.

BRIEF DESCRIPTION OF THE INVENTION

Disclosed herein is an electrolyte for a metal-oxygen battery. The electrolyte comprises a non-aqueous solvent which is characterized in that the solubility of oxygen in that solvent is at least 0.1150 cc $O_2$ per cc of solvent at STP (one atmosphere of pressure at 0° C.). The electrolyte further includes a metal electrolyte salt which is dissolved in the solvent. In particular embodiments of the invention, the solvent is comprised of a plurality of components, and at least 50%, on a weight basis, of the solvent is comprised of components in which the solubility of oxygen is at least 0.1760 cc $O_2$ per cc of the component.

In particular embodiments of the present invention, the electrolyte is employed in a lithium-oxygen battery, and the metal electrolyte salt is a lithium salt. Some specific solvents of the present invention are comprised of one or more of: diethyl carbonate, ethyl methyl carbonate, tetrahydrofuran, 1,2-dimethoxyethane, diethyl ether, tetrahydro-2H-pyran, methyl acetate, n-$C_8H_{18}$, n-$C_9H_{20}$, n-$C_7H_{16}$, n-$C_7F_{16}$, as well as other fluorinated organic solvents.

Also disclosed herein is a method for optimizing the composition of an electrolyte for a metal-oxygen battery. The method includes the step of selecting the solvent for the electrolyte from those materials which will dissolve an electrolyte salt, and in which the solubility of oxygen is at least 0.1150 cc $O_2$/cc at STP. Specifically disclosed are lithium-oxygen batteries which include the solvent of the present invention.

DESCRIPTION OF THE PREFERRED EMBODIMENTS

Figure 1:
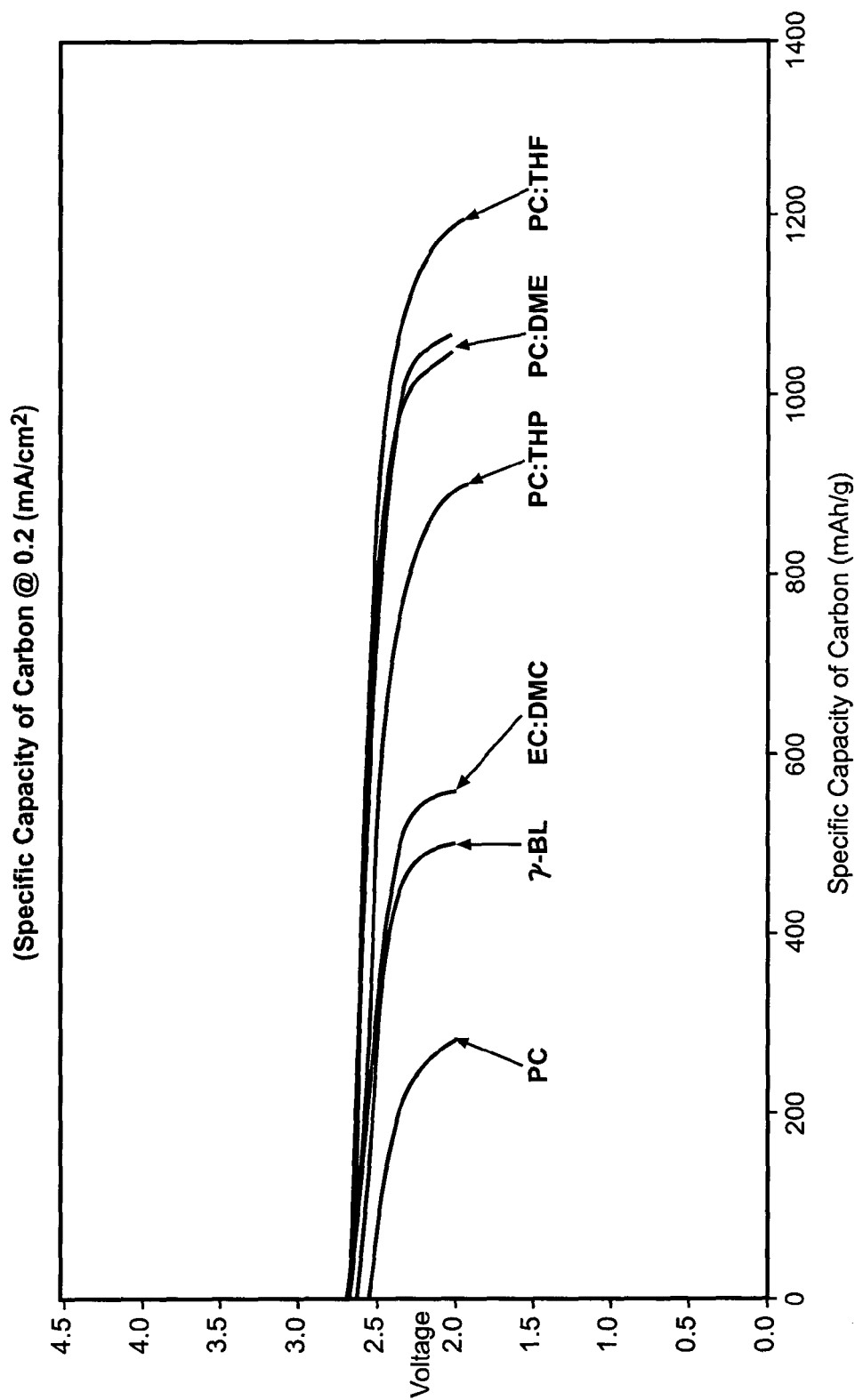
FIG. 1 is a graph depicting the discharge capacity in terms of milliamp hours per gram of cathode material, as a function of cell voltage for a series of cells including electrolytes of the prior art and electrolytes of the present invention.

The present invention departs from what was heretofore conventional wisdom regarding electrolytes for metal-oxygen batteries, and provides electrolytes which significantly enhance the operational parameters of such batteries. As discussed above, the prior art generally selected solvent component of battery electrolytes on the basis of dielectric constant and boiling point. In contrast, the present invention recognizes that battery performance correlates directly with the ability of the electrolyte to solvate oxygen. Therefore, in accord with the principles of the present invention, electrolytes for metal-oxygen batteries are comprised of a solvent component in which oxygen is relatively soluble. The electrolyte also includes a salt of one of the metals comprising the battery system, and in this regard, the solvent should also be capable of dissolving this salt. However, solubility of the salt is in the nature of a threshold issue insofar as solvents which do not solvate the salt are not suitable for electrolytes, but it has been found that of the solvents which can sufficiently solvate electrolyte salts, those in which oxygen is the most soluble provide superior battery performance.

In general, it has been found that solvent mixtures in which the solubility of oxygen, measured in terms of ccs of oxygen per cc of solvent at standard temperature and pressure, is at least 0.1150 provide significantly improved battery performance as compared to prior art solvents of the type disclosed in U.S. Pat. No. 5,510,209 discussed above. Some solvents having very good oxygen solvation characteristics comprise diethyl carbonate, ethyl methyl carbonate, tetrahydrofuran, 1,2-dimethoxyethane and tetrahydro-2H-pyran. Diethyl ether and methyl acetate have good oxygen solubilities, and are also very good solvents for the practice of the present invention. These materials are relatively low in boiling point; however, they have significant utility in either blended solvent systems or solvent systems for batteries which are operating under pressurized conditions. Hydrocarbons including n-$C_8H_{18}$, n-$C_9H_{20}$, n-$C_7H_{16}$ also have utility as solvents for battery electrolytes of the present invention. Fluorinated organic solvents such as n-$C_7F_{16}$, as well as other such materials including siloxy compounds, have very good solubilities for oxygen and may also be used in the present invention. Yet other materials will be apparent to those of skill in the art.

The solvent portion of the electrolyte of the present invention may be comprised of a single component, or it may be comprised of a plurality of components. In some instances, the solvent may be blended from a mixture of materials wherein one of the materials may have a relatively low solubility for oxygen and another a relatively high solubility for oxygen. For example, materials such as propylene carbonate, γ-butyrolactone and ethylene carbonate are typical of solvents heretofore employed in the preparation of metal-oxygen battery electrolytes. These materials have relatively low oxygen solubilities as compared to some of the preferred materials of the present invention; however, in some instances, these materials may be employed in combination with materials having high oxygen solubilities to produce high performance electrolytes. In general, it is desirable that the oxygen solubility of the solvent component, either as a single material or as a blend be at least 0.1150 cc $O_2$/cc. In some specifically preferred compositions, as will be described hereinbelow, higher solubilities are achieved. In the case of solvents comprised of a blend of materials, in some preferred embodiments, the mixture will be such that at least 50%, on a weight basis, of the solvent is comprised of one or more materials having an oxygen solubility of at least 0.1760 cc $O_2$/cc.

In addition to the solvent, electrolytes for metal-oxygen batteries will include one or more electrolyte salts. This component provides for ionic conductivity between the electrodes of the battery, and is typically a salt of the metal which forms the battery system. The present invention will be described herein with reference to lithium-oxygen batteries; however, it is to be understood that the principles of the present invention are applicable to all metal-oxygen battery systems. One electrolyte salt having utility in lithium batteries is $LiPF_6$. Some other salts which are often employed in lithium batteries include: $LiBF_4$, $LiClO_4$, $LiC(SO_2CF_3)_3$, $LiN(SO_2CF_3)_2$, $LiO_3SCF_2CF_3$, $LiO_3SC_6F_5$, $LiO_2CCF_3$, $LiP(C_6H_5)_4$, $LiCF_3SO_3$ and the like taken either singly or in combination. Other electrolyte salts will be readily apparent to those of skill in the art. Typically, the electrolyte salt is present in a concentration of approximately 0.5-1.0 M.

Table 1 hereinbelow lists the oxygen solubilities of a number of solvent materials. Table 2 lists the oxygen solubility of mixtures of solvent materials. Table 2 includes solvent mixtures having relatively low oxygen solubility such as the 1:1 propylene carbonate (PC):ethylene carbonate (EC) mixture of the prior art which has an oxygen solubility of 0.0584 cc $O_2$/cc. The favored solvent mixtures of the present invention have an oxygen solubility of at least 0.1150 cc $O_2$/cc, and include the last five entries on Table 2. Table 3 shows the oxygen solubilities solvents of Table 2 blended with different amounts of the electrolyte salt $LiPF_6$.

TABLE 1

Oxygen Solubility (Single Solvents)

| Solvent | cc $O_2$ per cc Solvent |
|---|---|
| tetramethylene sulfone (TMSO) | 0.0357 |
| ethylene carbonate (EC) | 0.0382 |
| dimethyl sulfoxide (DMSO) | 0.0416 |
| γ-butyrolactone (γ-BL) | 0.0550 |
| propylene carbonate (PC) | 0.0718 |
| N-methyl pyrolidinone (NMP) | 0.0721 |
| tetraethylene glycol dimethyl ether | 0.0993 |
| triethylene glycol dimethyl ether | 0.1054 |
| dimethyl carbonate (DMC) | 0.1632 |
| dipropyl carbonate (DPC) | 0.1754 |
| diethyl carbonate (DEC) | 0.1773 |
| ethyl methyl carbonate (EMC) | 0.1780 |
| tetrahydrofuran (THF) | 0.1978 |
| 1,2-dimethoxyethane (DME) | 0.2143 |

TABLE 2

Oxygen Solubility (Mixed Solvents)

| Solvent Mix | cc $O_2$ per cc Solvent |
|---|---|
| PC:EC (1:1 w/w) | 0.0584 |
| PC:DME (3:1 w/w) | 0.0862 |
| PC:DMC (1:1 w/w) | 0.9999 |
| PC:DEC (1:1 w/w) | 0.1168 |
| PC:DME (1:1 w/w) | 0.1185 |
| γ-BL:DME (1:2 w/w) | 0.1253 |
| PC:DME (1:2 w/w) | 0.1335 |
| PC:DME (1:4 w/w) | 0.1532 |

TABLE 3

Oxygen Solubility (Electrolytes)

| Electrolyte | cc $O_2$ per cc Solvent |
|---|---|
| 1 M $LiPF_6$ PC:EC (1:1) | 0.0482 |
| 1 M $LiPF_6$ PC:DME (1:1) | 0.0722 |
| 1 M $LiPF_6$ PC:DMC (1:1) | 0.0729 |
| 1 M $LiPF_6$ PC:DEC (1:1) | 0.0787 |
| 1 M $LiPF_6$ PC:DME (1:2) | 0.0998 |
| 0.5 M $LiPF_6$ PC:DME (1:2) | 0.1218 |
| 0.5 M $LiPF_6$ PC:DME (1:13) | 0.1248 |

Figure 2:
FIG. 2 is a graph depicting the maximum charge capacity of the group of cells of FIG. 1, in terms of milliamp hours per gram of cathode materials, when the cells are operated under various constant current conditions.

In a first experimental series, electrolytes of the present invention, and those of the prior art, were incorporated into lithium-oxygen cells, and the performance characteristics thereof were compared. In each of the cells, the cathode was comprised of a body of 90% high surface area carbon black (Super P), and 10% of a PTFE binder supported on an aluminum mesh. In each cell, the anode was comprised of a lithium foil supported on a nickel grid. The anode and cathode were separated by a non-woven polypropylene membrane manufactured by a melt-blown process. FIG. 1 depicts a series of electrolytes. Each included a 1M concentration of $LiPF_6$. The solvents for the electrolytes comprised: PC; γ-BL, 1:1 EC:DMC; 1:1 PC:THP; 1:1 PC:DME; and 1:1 PC:THF. Each of the six cells in the series was operated at a constant current of 0.2 mA/cm², and the specific capacity in terms of milliamp hours per gram of the carbon cathode was measured as a function of cell voltage. It will be seen from FIG. 1 that the PC:THP; PC:DME and PC:THF mixtures of the present invention provide significantly greater capacity than do the prior art compositions. In FIG. 2, this same series of cells were operated under constant current conditions of 0.05 mA/cm², 0.2 mA/cm² and 1.0 mA/cm², and the specific capacity of the carbon cathode in terms of mAh/g was measured. Again, it will be seen that the materials of the present invention provided significantly better performance at all current levels than did cells using prior art electrolytes.

Figure 3:
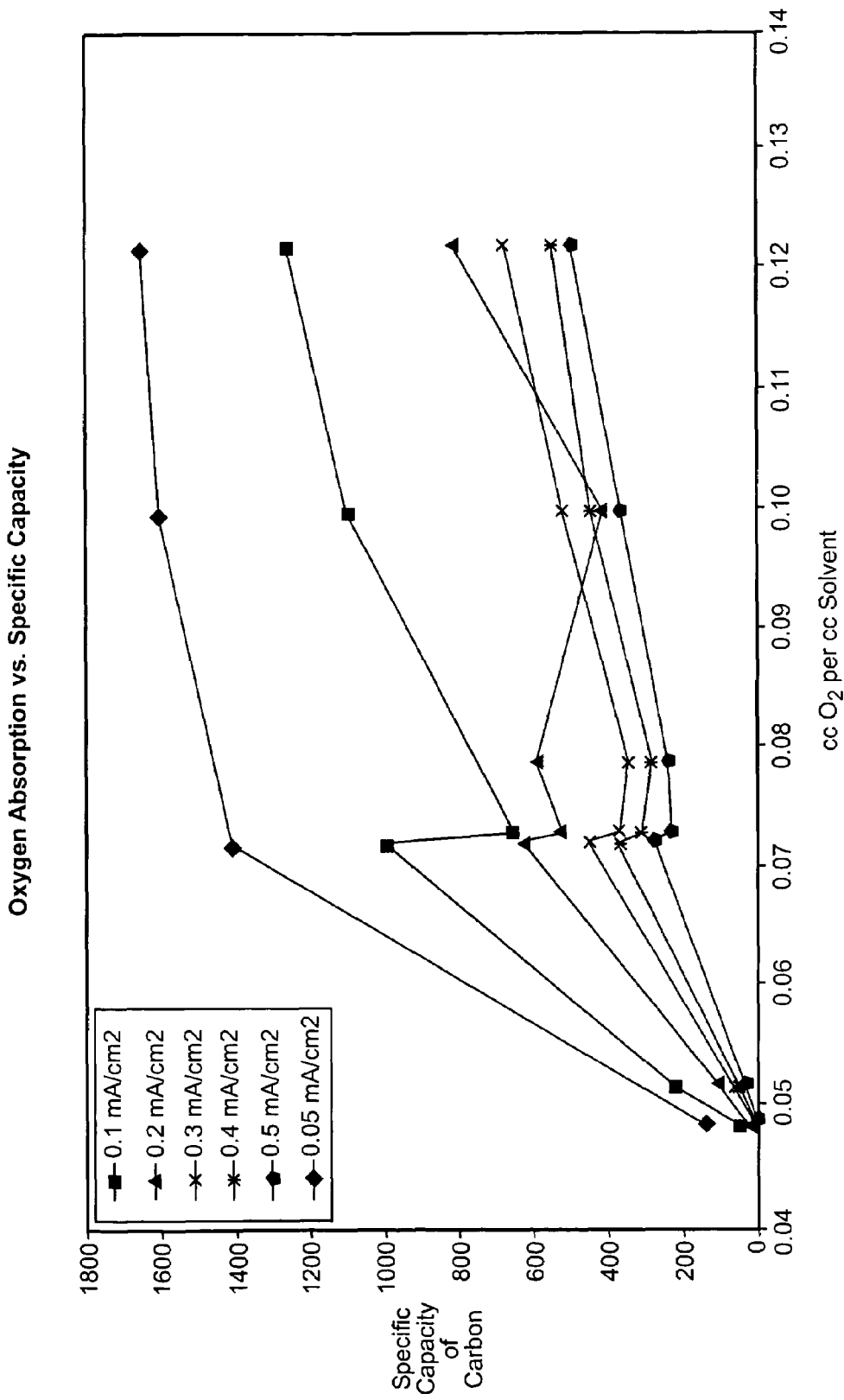
FIG. 3 is a graph showing the specific capacity of a carbon cathode as a function of dissolved oxygen in a battery electrolyte, at different discharge currents.

FIG. 3 is a graph showing the specific capacity of the carbon electrode of the previous experiments as a function of the amount of dissolved oxygen in the solvent for a range of discharge rates. In accord with the present invention, an increase in the amount of dissolved oxygen increases the specific capacity of the carbon cathode.

In accord with the general principle of the present invention, electrolytes providing significantly improved metal-oxygen battery performance can be selected by evaluating the oxygen solubility of the solvent components of the electrolyte. Some specifically preferred solvent mixtures comprise a 1:1 mixture of PC:THP, PC:DME and PC:THF. Yet other solvent mixtures of the present invention include a 1:1 mixture of PC:DEC, a 1:2 mixture of γ-BL:DME, a 1:2 mixture of PC:DME and a 1:4 mixture of PC:DME. Within the specific guidelines provided hereinabove, yet other solvent mixtures may be prepared in accord with the principles of the present invention.

The principles of the present invention have been described primarily with reference to a lithium-oxygen battery. It is to be understood that these principles may be applied, with equal advantage, to other metal-oxygen batteries. Also, while some specific materials for the practice of the present invention have been described, yet other materials will be readily apparent to one of skill in the art in view of the teaching presented herein. Therefore, it is to be understood that the foregoing drawings, discussion and description are illustrative of particular embodiments of the present invention, and are not meant to be a limitation upon the practice thereof.

What is claimed is:

1. An electrolyte solution for a metal-oxygen battery, the electrolyte comprising:
   a lithium salt selected from the group consisting of $LiPF_6$, $LiBF_4$, $LiClO_4$, $LiC(SO_2CF_3)_3$, $LiN(SO_2CF_3)_2$, $LiO_3SCF_2CF_3$, $LiO_3SC_6F_5$, $LiO_2CCF_3$, $LiP(C_6H5)_4$, $LiCF_3SO_3$;
   a non-aqueous solvent selected from the group of solvents having an oxygen solubility of greater than 0.1632 cc $O_2$/cc solvent at STP consisting of dimethyl carbonate (DMC), dipropyl carbonate (DPC), diethyl carbonate (DEC), ethyl methyl carbonate (EMC), tetrahydrofuran (THF), and 1,2-dimethoxyethane (DME), in combination with one or more solvents having an oxygen solubility of less than 0.1150 cc $O_2$/cc solvent at STP selected from a group consisting of propylene carbonate (PC), ethylene carbonate (EC), and γ-butyrolactone (γ-BL);
   wherein the oxygen solubility of the solvent combination is at least 0.1150 cc $O_2$/cc at STP; and
   wherein oxygen is reduced at a cathode surface of the metal-oxygen battery to produce $O^{-2}$ or $O_2^{-2}$ ions and an increase in the amount of dissolved oxygen in the electrolyte increases the specific capacity of the cathode.

2. A metal-oxygen battery comprising:
   a metal-containing anode;
   a cathode for reducing the oxygen;
   an electrolyte solution of a lithium salt selected from the group consisting of $LiPF_6$, $LiBF_4$, $LiClO_4$, $LiC(SO_2CF_3)_3$, $LiN(SO_2CF_3)_2$, $LiO_3SCF_2CF_3$, $LiO_3SC_6F_5$, $LiO_2CCF_3$, $LiP(C_6H_5)_4$, $LiCF_3SO_3$;
   a non-aqueous solvent for the electrolyte selected from the group of solvents having an oxygen solubility of greater than 0.1632 cc $O_2$/cc solvent at STP consisting of dimethyl carbonate (DMC), dipropyl carbonate (DPC), diethyl carbonate (DEC), ethyl methyl carbonate (EMC), tetrahydrofuran (THF), and 1,2-dimethoxyethane (DME), in combination with one or more solvents having an oxygen solubility of less than 0.1150 cc $O_2$/cc solvent at STP selected from a group consisting of propylene carbonate (PC), ethylene carbonate (EC), and γ-butyrolactone (γ-BL);
   wherein the oxygen solubility of the solvent combination is at least 0.1150 cc $O_2$/cc at STP; and
   wherein oxygen is reduced at a cathode surface of the metal-oxygen battery to produce $O^{-2}$ or $O_2^{-2}$ ions and an increase in the amount of dissolved oxygen in the electrolyte increases the specific capacity of the cathode.

3. The metal-oxygen battery of claim 2, wherein the cathode comprises carbon.

4. A lithium-oxygen battery comprising:
   a lithium metal-containing anode;
   a cathode for reducing oxygen;
   an electrolyte solution of a lithium salt selected from the group consisting of $LiPF_6$, $LiBF_4$, $LiClO_4$, $LiC(SO_2CF_3)_3$, $LiN(SO_2CF_3)_2$, $LiO_3SCF_2CF_3$, $LiO_3SC_6F_5$, $LiO_2CCF_3$, $LiP(C_6H5)_4$, $LiCF_3SO_3$; and
   a non-aqueous solvent selected from the group of solvents having an oxygen solubility of greater than 0.1632 cc $O_2$/cc solvent at STP consisting of dimethyl carbonate (DMC), dipropyl carbonate (DPC), diethyl carbonate (DEC), ethyl methyl carbonate (EMC), tetrahydrofuran (THF), and 1,2-dimethoxyethane (DME), in combination with one or more solvents having an oxygen solubility of less than 0.1150 cc $O_2$/cc solvent at STP selected from a group consisting of propylene carbonate (PC), ethylene carbonate (EC), and γ-butyrolactone (γ-BL);
   wherein the oxygen solubility of the solvent combination is at least 0.1150 cc $O_2$/cc at STP; and
   where oxygen is reduced at a cathode to produce $O^{-2}$ or $O_2^{-2}$ ns which react with lithium to produce $Li_2O_2$, that deposits on the cathode.

5. The lithium-metal battery of claim 4 wherein the cathode comprises carbon.

* * * * *